March 13, 1934. J. F. KOHLER 1,950,495
PIE MAKING MACHINE
Filed Sept. 15, 1932   7 Sheets-Sheet 1

INVENTOR
John F. Kohler
BY
Charles G. Hensley
ATTORNEY

March 13, 1934.  J. F. KOHLER  1,950,495
PIE MAKING MACHINE
Filed Sept. 15, 1932   7 Sheets-Sheet 2

March 13, 1934.  J. F. KOHLER  1,950,495
PIE MAKING MACHINE
Filed Sept. 15, 1932  7 Sheets-Sheet 3

INVENTOR
John F. Kohler
BY
Charles G. Newsley
ATTORNEY

March 13, 1934. J. F. KOHLER 1,950,495
PIE MAKING MACHINE
Filed Sept. 15, 1932 7 Sheets-Sheet 6

March 13, 1934. J. F. KOHLER 1,950,495
PIE MAKING MACHINE
Filed Sept. 15, 1932   7 Sheets-Sheet 5

INVENTOR
John F. Kohler
BY
Charles G. Hensley
ATTORNEY

Patented Mar. 13, 1934

1,950,495

UNITED STATES PATENT OFFICE 1,950,495

PIE MAKING MACHINE

John F. Kohler, White Plains, N. Y.

Application September 15, 1932, Serial No. 633,275

29 Claims. (Cl. 107—1)

The present invention relates to a machine for making pies or other food products. The present machine is adapted to roll out one or more strips of dough in the form of a continuous sheet or strip which is fed onto pans or pie plates moved along in close succession past the rolling device, so that the strip of dough is laid as a continuous sheet upon the plates and is afterwards cut to the shape of the plates or pans. Where there is to be both a bottom and top crust there may be two sets of devices for rolling strips of dough, one for depositing the dough to form the bottom crust and another to roll and feed a second strip upon the pie plates after the first layer has been applied and after the filler has been placed on top of the first layer of dough, so that the second strip of dough will form the tops or covers for the pies. It will be apparent, therefore, that the present invention is adapted for making both covered and uncovered pies. Instead of this arrangement, each plate may be caused to travel twice around with the turret receiving a layer of dough each time, the filler being applied on the plate between the two operations.

The present machine is designed, insofar as certain features of the invention are concerned, to form a circular machine; that is, one in which the pie plates are moved in a circular path in order to feed them past the dough supplying device, and thence away from the latter after the dough has been applied, as distinguished from the long or straight types of machines.

The advantages of the circular pie making machine are obvious and well known, but heretofore such circular pie machines as have been proposed have required that the dough be rolled out before being supplied to the pie making machine.

In the present case I have disclosed a machine where the dough for the pie crust is rolled out continuously in the form of a strip or ribbon and is automatically applied to the successive plates as they are presented to the rolling device. If desired, the circular device for conveying the pie plates may be run continuously so that pies are made at a high rate of speed.

In order that the dough may be formed in a continuous strip or ribbon and be applied to the pie plates, travelling in a circular path, without folding the dough or making it irregular, I have designed an apparatus for rolling out the dough and automatically forming it as a ribbon or strip of arcuate shape, and the curvature of this strip of dough is such as to conform with the arcuate path travelled by the several plates. The strip of dough, therefore, is not distorted when laid upon or fed to the pie plates, but instead it is received in a flat, even sheet after which the portions of the strip of dough projecting from or overhanging the rims of the plates are trimmed off so that individual pieces of dough remain upon the plates and conform to the shape thereof.

One branch of my invention relates to the mechanism for rolling out a strip of dough of curved shape, which is presented automatically upon the tops of the plates as the latter are carried around in a circular path. If there is to be a top as well as a bottom crust on the pies, the dough rolling device may be duplicated so that a second sheet of dough is applied (over the filling) in the same manner as the first dough, although its thickness and consistency may be somewhat different from the dough forming the lower crust in accordance with common practice in pie making.

The dough rolling device produces the strip in curved shape conforming with the circular path travelled by the plates, and for this purpose the dough is rolled between or through rollers of frusto conical shape, so that the strip of dough is of uniform thickness, but is curved as stated above. The dough rolling device is driven at the required speed to deliver the strip of dough at the same speed at which the plates travel under the dough rolling apparatus.

In connection with the device for rolling the dough I provide an adjustable guard co-operating with a roller to limit the extent of contact of the dough with the rollers and I make this guard adjustable in order that the surface contact of the rollers will be sufficient to provide traction for propelling the dough from the hopper through the bight of the frusto conical rollers and out in the form of a continuous strip, and at the same time limit the surface contact of the dough with the rollers in order to avoid excessive working of the dough beyond that necessary to carry out the function of the rollers. It is well known that shortened dough, used for pie crust, cannot be worked, compressed or manipulated excessively as otherwise when the dough is baked into pie crust it will be tough. For this reason it is desirable to reduce the working action of the machine upon the dough as much as possible.

I also provide a device for dusting flour upon a roller in advance of the point at which the dough first comes into contact with the surface thereof in order that the dough will not adhere tenaciously thereto. In the preferred form of construction there is a third roller moving at a lower speed than the propelling rollers and serving to advance the dough in the bottom of the hopper toward the two feed rollers instead of the dough resting against a stationary surface.

In association with the dough rolling devices I provide a marker for marking the strip of dough at regular intervals for the purpose of indicating on each individual pie a letter or other mark which will signify the kind of pie which is made in the machine. That is, it will indicate the kind of filler, whether berries, fruits or other material. This marking device co-operates with one of the feed rollers and it is periodically brought into contact with the strip of dough at regular intervals and is then moved out of contact with the dough so that the surface of the marking members will be in contact with the dough only during the period when the actual marking takes place.

The marking device is revolved in accordance with the speed of the movement of the sheet of dough and in the same direction while in contact with the dough; and when the marking members are moved away from the dough they are returned to the initial or starting position automatically by spring action. The marking members, therefore, oscillate or move back and forth instead of moving continuously in one direction.

Other advantages of my invention will be set forth in the following detailed description.

In the drawings forming part of this application.

Figure 1:
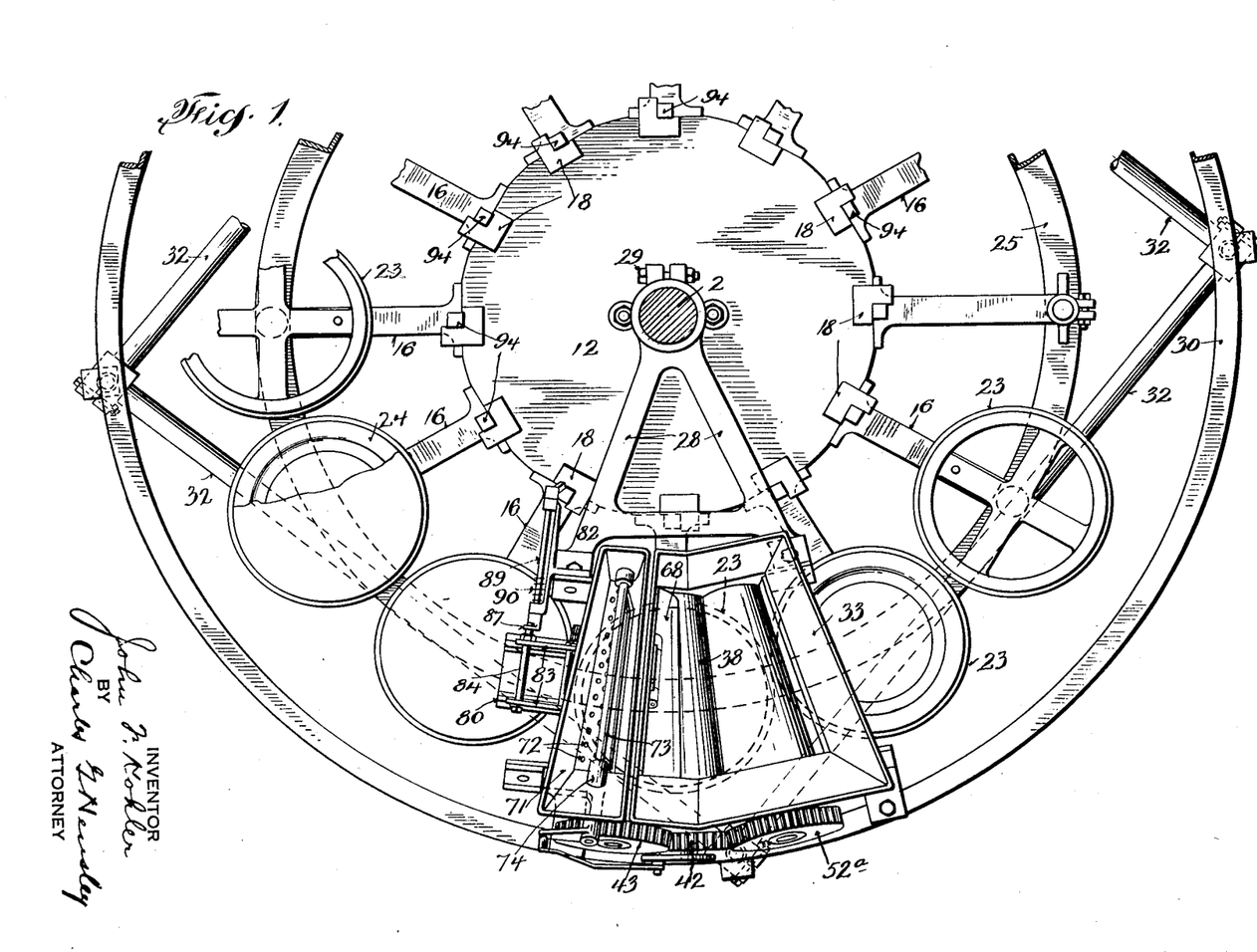
Figure 1 is a plan view of a portion of a machine embodying my invention.
Figure 2:
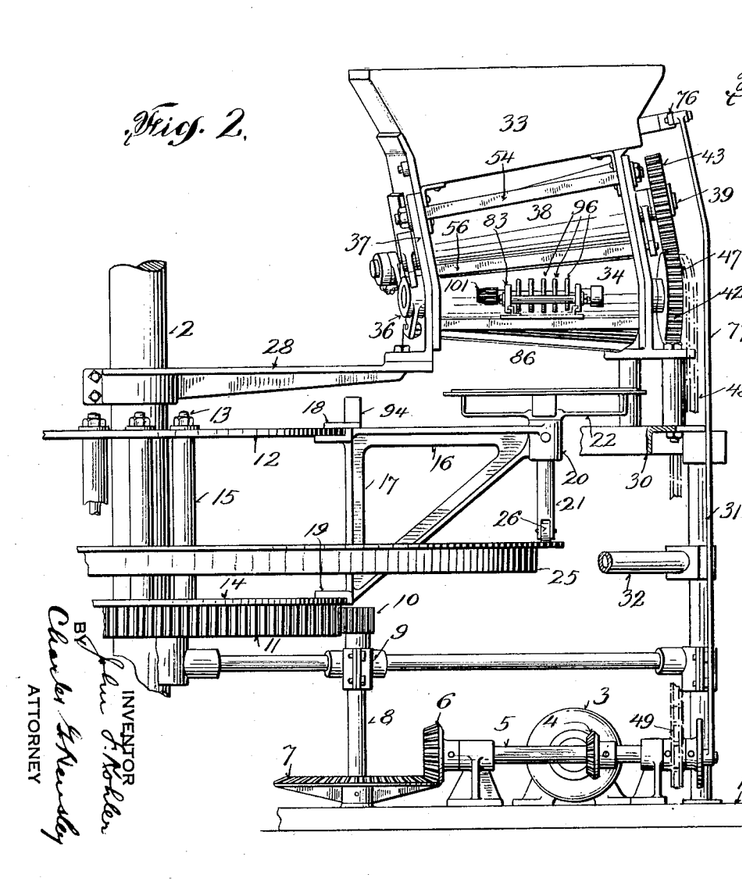
Figure 2 is an elevation of one side of the machine where the dough rolling and feeding device is located, some of the parts being broken away.

In Figure 1 I have shown in plan most of the parts of the complete machine, it being understood that the portion broken away at the top of the view includes parts which are a duplication of those illustrated in the lower half of the view. The frame portion of the machine is mounted on a base 1 adapted to rest upon a floor and centrally located in the machine there is a vertically disposed post 2 around which the turret revolves. There is an operating motor 3 shown mounted on the base of the machine and its shaft is connected by mitre gears 4, to operate the horizontal shaft 5 from which operating force is distributed to drive the various mechanisms of the machine.

On one end of this shaft there is a mitre gear 6 which meshes with and drives a horizontally disposed mitre gear 7 and the latter is fixed to a vertically disposed shaft 8 having one end journaled on the base of the machine and the other in the bracket 9. This vertically disposed shaft, which is driven from the motor through the means just described, is provided at its upper end with a pinion 10 which meshes with and drives a large gear 11 which is mounted to revolve around the central post 2.

The turn table or turret for carrying the pie plates consists of the following: There is a centrally located and substantially circular plate 12 which is adapted to revolve around the central post 2; and this plate is bolted by means of bolts 13 together with a lower circular plate 14, sleeves 15 surrounding the bolts and disposed between the upper and lower circular plates to retain them in fixed, spaced relation. The lower plate 14 is formed as part of or attached to the large gear 11 and from what has been said it will be apparent that as this large gear is revolved by the pinion 10 both upper and lower plates 12, 14 will be revolved around the central post.

At regular intervals there are attached to the circular plates 12, 14 triangular brackets 16 each having a vertical arm 17 extending between the outer edges of the upper and lower circular plates and at opposite ends of this arm of the triangular brackets there are horizontal members 18 for engaging opposite surfaces of the upper circular plate 12 and at the lower end of the vertical arm there is a horizontal member 19 engaging the top surface of the lower plate 14. These several engaging members may be, and preferably are, bolted to the upper and lower circular plates 12, 14 in order to secure the triangular brackets to these plates.

The triangular brackets are arranged in vertical planes which are radially disposed in relation to the circular plates, so that they project outwardly therefrom and at their outer, free ends each triangular bracket is provided with a hub 20 in which the post 21 of a vertically movable plate carrier is mounted. Each plate carrier is provided with a spider 22 mounted on the upper end of the post 21 and on the outer end of the spokes of the spider there is an annular member 23 forming a pocket to receive therein an ordinary pie plate 24 of the size for which the machine is adapted.

Each plate holder is caused to traverse a circular path by moving with the turret around the axis of the central post 2. There is a track or guiding member 25 of annular shape, mounted concentrically in relation to the central post 2 and the lower end of each post 21 is provided with a roller 26 which rides on the top surface of the annular member 25.

I have shown a heavy three-arm bracket 28 clamped on the central post 2 by means of the bolts 29 and this bracket extends horizontally and radially from the post and forms a support for one end of the dough rolling device. There is an annular member 30 shown as made of angle iron and disposed concentrically of the central post 2 and mounted upon and secured to a series of vertical supporting posts 31 which rest upon the base 1 of the machine. The various vertical posts 31 are tied to each other for rigidity by means of the pipes or bars 32 which are shown as disposed in the form of cords to the annular member 30. These several structural members form a supporting means for the outer end of the dough rolling mechanism or the end which is farthest from the central post.

The dough rolling device has a stationary position over the path of the circularly moving plate holders of the turret so that as the plates travel successively under it the strip of dough is fed onto the tops of the several plates. The dough rolling part of the mechanism is constructed as follows: There is a hopper 33 into which a quantity of dough is placed and to which dough is supplied from time to time to be fed by the rollers. This hopper is shown as mounted on the stationary bracket 28 and also upon the annular ring 30 in a position elevated above the path of the plate carriers to leave a space below the hopper for the dough rollers.

As stated above, the dough rollers are of frusto conical shape in order to roll out a ribbon of uniform thickness and of arcuate shape, the curvature corresponding with the arcuate path traversed by the plate holders. I have shown a lower frusto conical roller 34 the shaft 35 of which is journaled in the hubs 36 shown as formed in the end walls 37 forming continuations of the hopper. This roller 34 has an outer surface which is frusto conical and it is so mounted that its axis is directed radially or substantially radially in relation to the axis of the center post 2.

Figure 3:
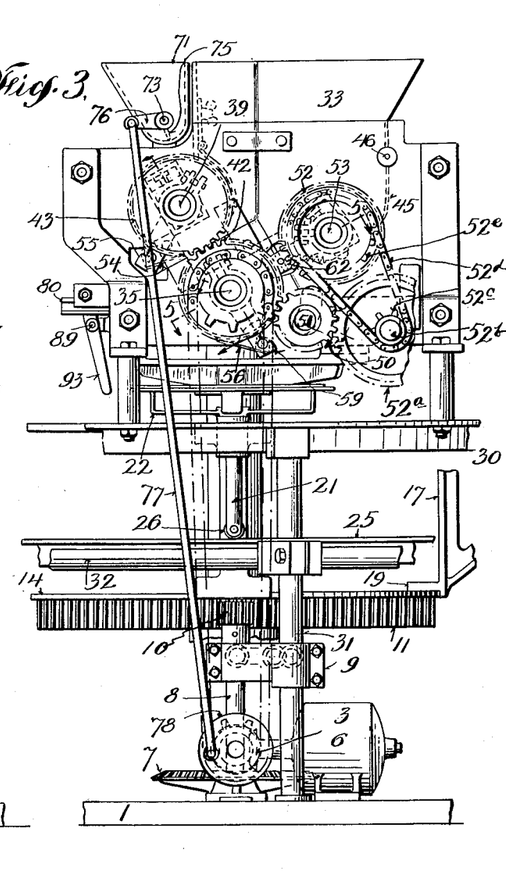
Figure 3 is a front elevation of part of the machine in which the parts are viewed at right angles to that in Figure 2.
Figure 4:
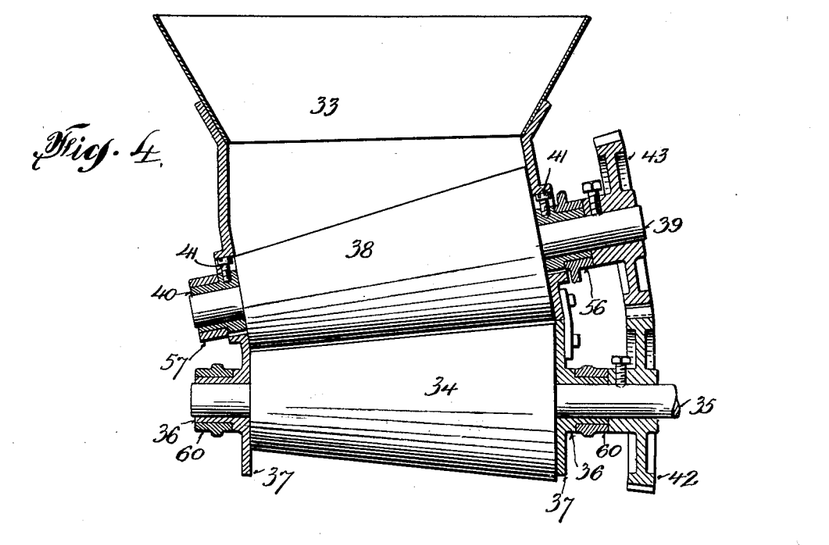
Figure 4 is a sectional view taken on the line 4—4 of Figure 3.
Figure 5:
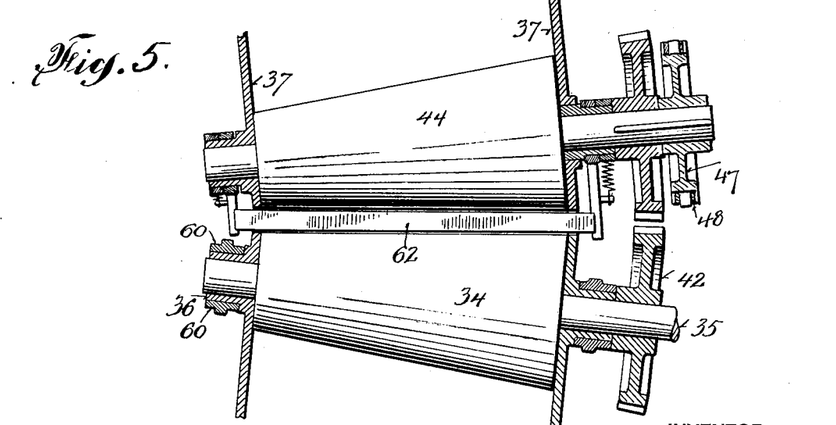
Figure 5 is a sectional view taken on the line 5—5 of Figure 3.
Figures 6, 7:
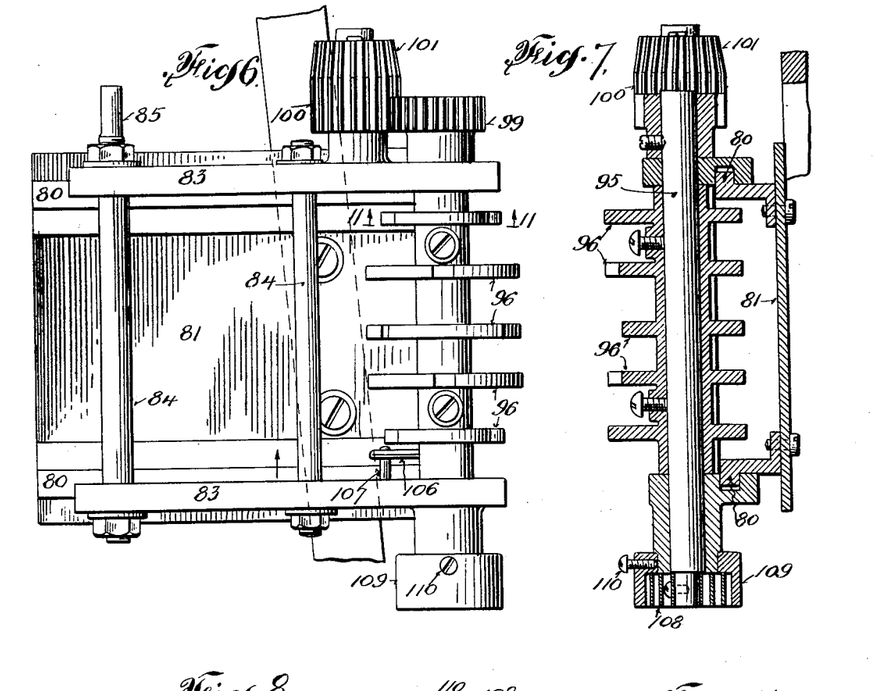
Figure 6 is a plan view on an enlarged scale, of the principal parts of the marking device.
Figure 7 is a sectional view taken on the line 7—7 of Figure 6.
Figure 8:
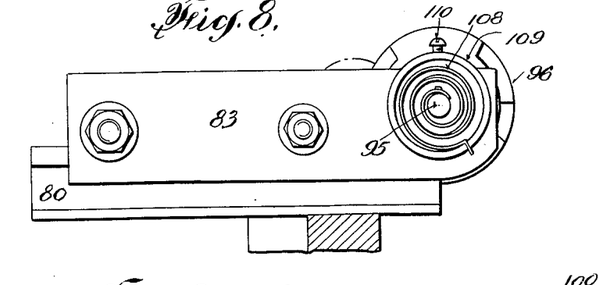
Figure 8 is an end view of the parts shown in Figure 6.

Above and slightly to the left of this roller as viewed in Figure 3, there is another frusto conical roller 38 the shaft 39 of which is journaled in bearing blocks 40 which are adjustably mounted in the plates 37, the bearing blocks being adapted to be adjusted toward and from the axis of the shaft 35 of the lower conical roller by means of the adjusting screws 41 in order to vary the spacing between the frusto conical rollers.

This adjustment is so made that the peripheries of the frusto conical rollers at the bight of these rollers remain parallel with each other so that the thickness of the sheet of dough will be uniform throughout its width. The adjustment permits of variations in the thickness of the strip of dough to correspond with different requirements and to permit relatively thin or thick strips of dough to be delivered from the rollers. On the shaft 35 of the lower frusto conical rollers there is a gear 42 which meshes with the gear 43 fixed to the shaft 39 of the upper roller, the gears having their teeth slightly pitched to allow for the angular relation of the two shafts 35, 39. These gears cause the two frusto conical rollers to revolve in unison and at the same surface speed.

The upper frusto conical roller 38 is preferably of the same angular formation or of the same shape as the lower roller 34 and its shaft 39 is also pitched so that its axis is disposed substantially radially of the axis of the central post 2 of the machine. The pitch or angle of the peripheries of both frusto conical rollers is such that the strip of dough delivered from them will be of arcuate shape and correspond with the curvature of the path traversed by the plate holders and they are designed in the drawings.

To the right and slightly above the frusto conical roller 34 as viewed in Figure 3, there is a third roller 44 which is also preferably made of frusto conical shape and of the same pitch or taper as the two rollers just described. This third roller forms part of the bottom of the hopper. The scraper plate 45 mounted pivotally on the shaft 46 has its lower edge resting against the surface or periphery of this roller to confine the dough within the bottom of the hopper.

This third, conical roller on which the dough in the hopper rests is operated, preferably, at a much lower surface speed than the two rollers 34, 38 and its purpose is to slowly urge the dough within the hopper toward the surfaces of the rollers 34, 38 which are exposed within the bottom of the hopper, in order that the latter rollers will take the dough and propel it through the bight of the two rolling rollers 34, 38. The roller 44 therefore keeps the body of dough slightly moving towards the rollers 34, 38 so that no portion of it will become pocketed and remain within the hopper; and it is an advantage that this roller operate slowly in order not to excessively agitate or work the dough but only feed it to the rollers 34, 38 at the required speed to supply the latter with sufficient dough for the formation of a continuous strip.

The shaft 53 of this third roller is also directed toward the axis of the post 2 and the taper of this roller preferably corresponds with the taper of the two rollers 34, 38.

On the outer end of the shaft 35 of the lower conical roller 34 there is a sprocket 47 over which travels the chain 48. The latter also engages around a sprocket wheel 49 on the lower horizontal shaft 5 which is driven by the motor; and through these several parts operating force is transmitted from the motor to the lower conical roller. As the conical rollers 34 and 38 are connected through the gears 42, 43 to operate in unison, the operating force thus applied to the lower shaft 35 causes both conical rollers 34, 38 to revolve in unison or at the same surface speed.

There is a gear 50 mounted on a shaft 51 and this gear meshes with the gear 42 on the shaft 35 of the lower frusto conical roller. The small gear 50 meshes with and drives a gear 52a mounted on a stud shaft 52b. On the latter there is a small sprocket 52c over which travels a chain 52d. The latter also travels over a larger sprocket 52e on the shaft 53, so that the latter shaft and its roller 44 are operated at a lower speed than the rollers 34, 38.

There is a scraping blade 54 mounted on a bar 55 which is carried by the arms 56 and these arms are provided with hubs 57 which surround the shaft 39 of the upper conical roller and are revolvable about the bearing blocks 40. The scraping blade 54 which is parallel with the periphery of the upper conical roller presses against the surface of this roller, just beyond the bight of the rollers 34, 38, and prevents the strip of dough which is passing through the bight of the conical rollers from following the surface of the upper roller. A similar scraper blade 58 is mounted on a bar 59 which is supported by the arms 60.

These arms have hubs 61 which are revolvably mounted on the hubs 36 in which the shaft 35 is journaled. The scraper blade 58 conforms to the periphery of the lower roller 34 and its free edge presses against the surface of this roller at or near the bottom thereof as viewed in Figure 3; and the blade causes the strip of dough which is travelling partly around the roller 34 to be stripped from the latter and to move downwardly upon the travelling pie plates. There is a bar 62 extending across the bight of the two rollers 34, 44 to close the space between these and prevent the dough from passing downwardly through the bight of the two rollers 34, 44.

Figures 19, 20, 21, 22, 23, 24:
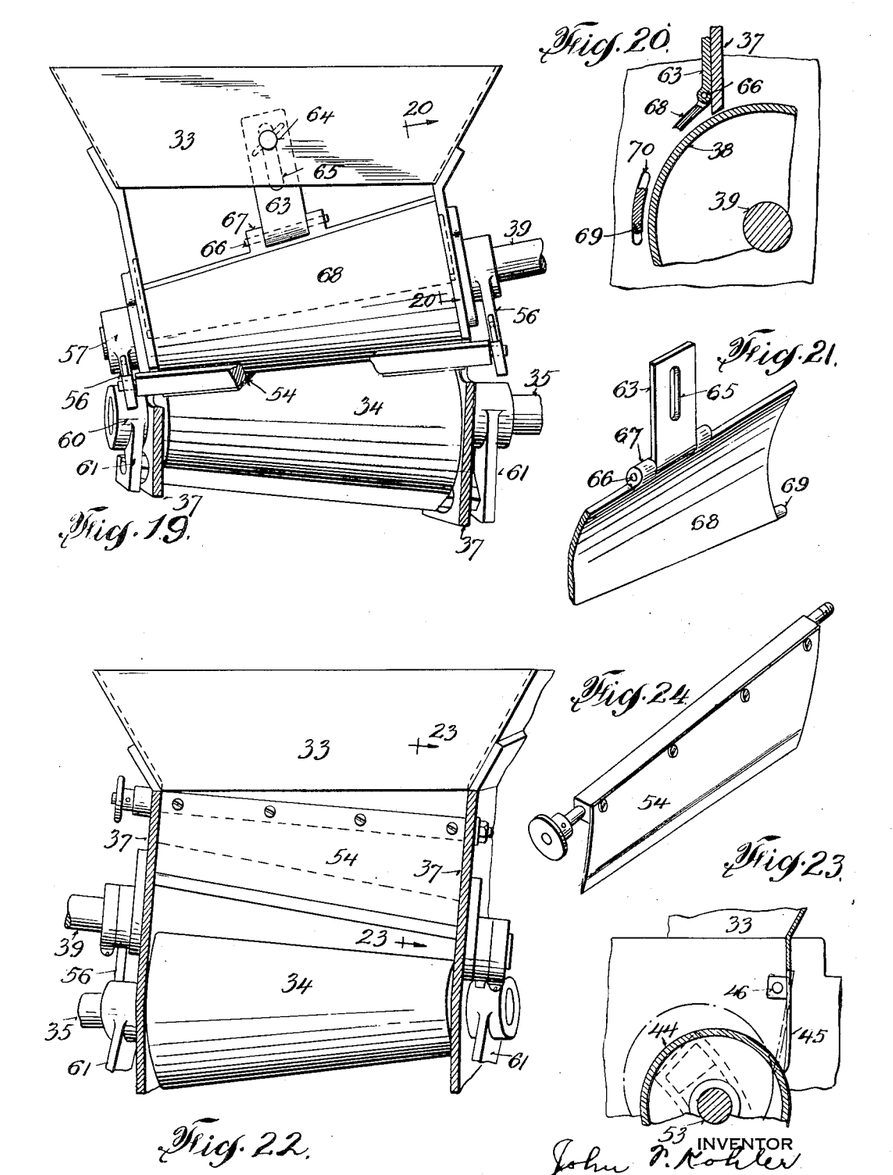
Figure 19 is a sectional view which shows the frusto conical dough rollers in elevation.
Figure 20 is sectional view taken on the line 20—20 of Figure 19.
Figure 21 is a broken perspective view of a portion of one of the roller guards.
Figure 22 is an enlarged sectional view showing in elevation the frusto conical rollers as viewed in the opposite direction to that shown in Figure 19.
Figure 23 is a sectional view taken on the line 23—23 of Figure 22.
Figure 24 is a perspective view of one of the scrapers for dislodging the strip of dough from the conical rollers.

I have provided an adjustable guard for the upper frusto conical roller 38 to limit the extent of contact of the body of dough in the hopper with the periphery of this roller, as shown more clearly in Figures 19 to 21. There is a strap 63 which is connected with one wall of the hopper by means of a bolt 64 which passes through the elongated slot 65 of the strap, so that the position of the strap may be adjusted substantially vertically upon the wall of the hopper. The lower end of this strap has a pin 66 journaled in a loop therein and on this pin are carried two ears 67 which are formed along the upper edge of a curved guard plate 68.

This guard plate is curved to conform with the curvature of the periphery of the roller 38 so that when this plate is in the position shown in Figure 20 it will lie parallel with the surface of the conical roller. This shape is not imperative but for compactness and to secure better results it is better that it be formed to lie parallel with the surface of the frusto conical roller. At the lower corners of the plate 68 there are laterally projecting pintles 69 which extend into arcuate slots 70 formed in the walls 37 and these pintles hold the lower portion of the pivotal plate in proper relation to the periphery of the frusto conical roller 38.

Preferably, the arcuate slots 70 are formed concentric with the periphery of the rollers 38. As the strap 63 is raised, the plate 68 will be lifted with it and the pintles 69 will travel upwardly in the arc of the slots 70. The higher the strap 63, and likewise the plate 68, is lifted, the more of the surface of the roller 38 will be exposed or uncovered, so that there will be a larger surface contact between the dough and the surface of the roller 38. Conversely, if the strap 63, and with it the plate 68, are lowered, the greater will be the covering action of the plate 68 in relation to the roller 38 so that the area of the surface of the roller engaged by the dough will be decreased. The plate 68, during the adjustment of the strap 63, will pivot on the pintles 69 and the plate at the top will pivot upon the pin 66 in relation to the strap, so that the strap may remain flat against the wall of the hopper in various positions of adjustment of the plate. A similar plate may be provided for the roller 34 if desired.

It is necessary or desirable to adjust the guard or plate 68 in order to expose more or less of the periphery of the roller 38 to contact of the dough within the hopper, in order to increase or decrease the traction between this roller and the body of dough to arrive at a point where this traction will be sufficient for a given kind of dough to be propelled through the bight of the rollers 34, 38 without excessive slippage of the rollers in relation to the dough and at the same time prevent the rollers from carrying toward the bight of the rollers more dough than is required to form the strip of predetermined thickness. If the rollers 34, 38 have a tendency to carry more dough toward the bight of these rollers, than is required to form the strip, an excessive pressure upon the dough is created and as is well known, working and compression of dough which is to form pie crust tends to make the crust tough.

The plate 68 will therefore be adjusted partly to accord with the spacing of the two rollers 34, 38 and therefore with the thickness of the rolled strip of dough and to prevent unnecessary compression of the dough by the rollers 34, 38. If there is too much traction between these rollers and the dough for a given set of conditions, there will either be slippage as between the surfaces of these rollers and the dough in the lower portion of the hopper or there will be excessive compression of the dough.

I have provided means for automatically dusting flour upon the upper roller 38 so that this flour will travel around with the roller and be pressed against and into one surface of the strip of dough as it is formed and delivered from the bight of the two rollers. This will cause the flour to be pressed more or less into the surface of the dough which is a desirable feature in order to produce a flaky pie crust when the dough is baked. At one side of the hopper I have shown a holder or receptacle 71 for holding a supply of dusting flour as shown in Figures 1 and 3. The bottom portion of the receptacle is provided with a number of small apertures 72 through which the flour is adapted to be sifted and from which the flour falls onto the periphery of the roller 38.

There is a rod 73 journaled in bosses 74 formed in the side walls of the receptacle 71 and this rod is provided with a stirring member 75 that sweeps across the bottom surface of the receptacle 71 for the purpose of agitating the flour across the apertures 72 to cause it to sift through these apertures onto the roller 38. The rod 73 extends to the exterior of the receptacle 71 and on this end it has a crank arm 76 which is pivotally connected with a long pitman 77.

The lower end of the latter is pivotally connected with a crank disc 78 on the lower shaft 5. The revolving motion of the shaft 5 carrying with it the crank disk 78 causes the pitman 77 to be rocked up and down and the motion is transmitted through the crank arm 76 to the rod 73 so that the agitator 75 is oscillated back and forth opposite the apertures 72. I have shown the receptacle 71 as tapered so that it is wider at one end than the other. A similar dusting device may be arranged to dust flour on the roller 34 if desired.

The apparatus for marking the strip of dough as it is formed is constructed as follows: The marking takes place against the dough while it is travelling partly around the lower conical roller 34 as may be seen more clearly in Figure 18. There are guiding tracks 80 stationarily mounted on a platform 81 which is carried by a cross beam 82 connected to the stationary frame of the machine. Mounted to reciprocate upon these tracks is a carriage consisting of the side plates 83 which are connected in separated relation by the cross bolts 84. This carriage has a laterally projecting pin 85 which extends through an elongated slot 86 in one arm 87 of a lever which is pivoted on a bracket 88.

This lever arm 87 is secured to a shaft 89 which is journaled at opposite ends in hubs of the bracket 87. There is a coiled spring 90 surrounding this shaft and having one end engaging the bracket 87 while the other end is inserted in an aperture in the shaft. The purpose of this spring is to revolve the shaft in one direction. There is a pin 91 projecting from the bracket 87. Connected with the hub of the lever arm 87 there is a pin 92 which is adapted to engage with the stop pin 91 to limit the revolving motion of the shaft 89 in one direction and thereby limit the return throw of the carriage 83.

Figure 12:
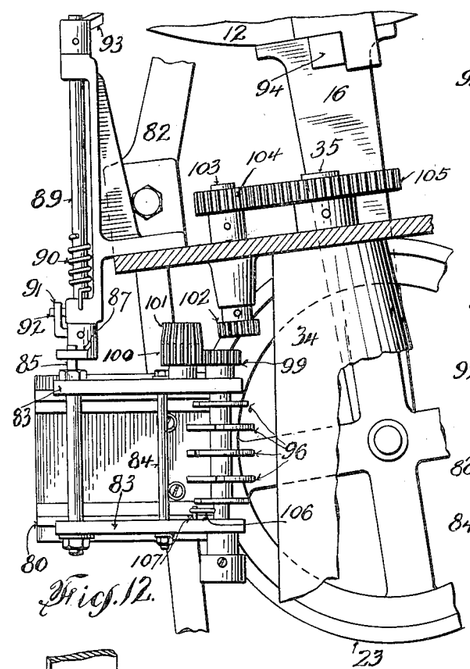
Figure 12 is a sectional view showing in plan the various parts of the marking device.
Figures 17, 18:
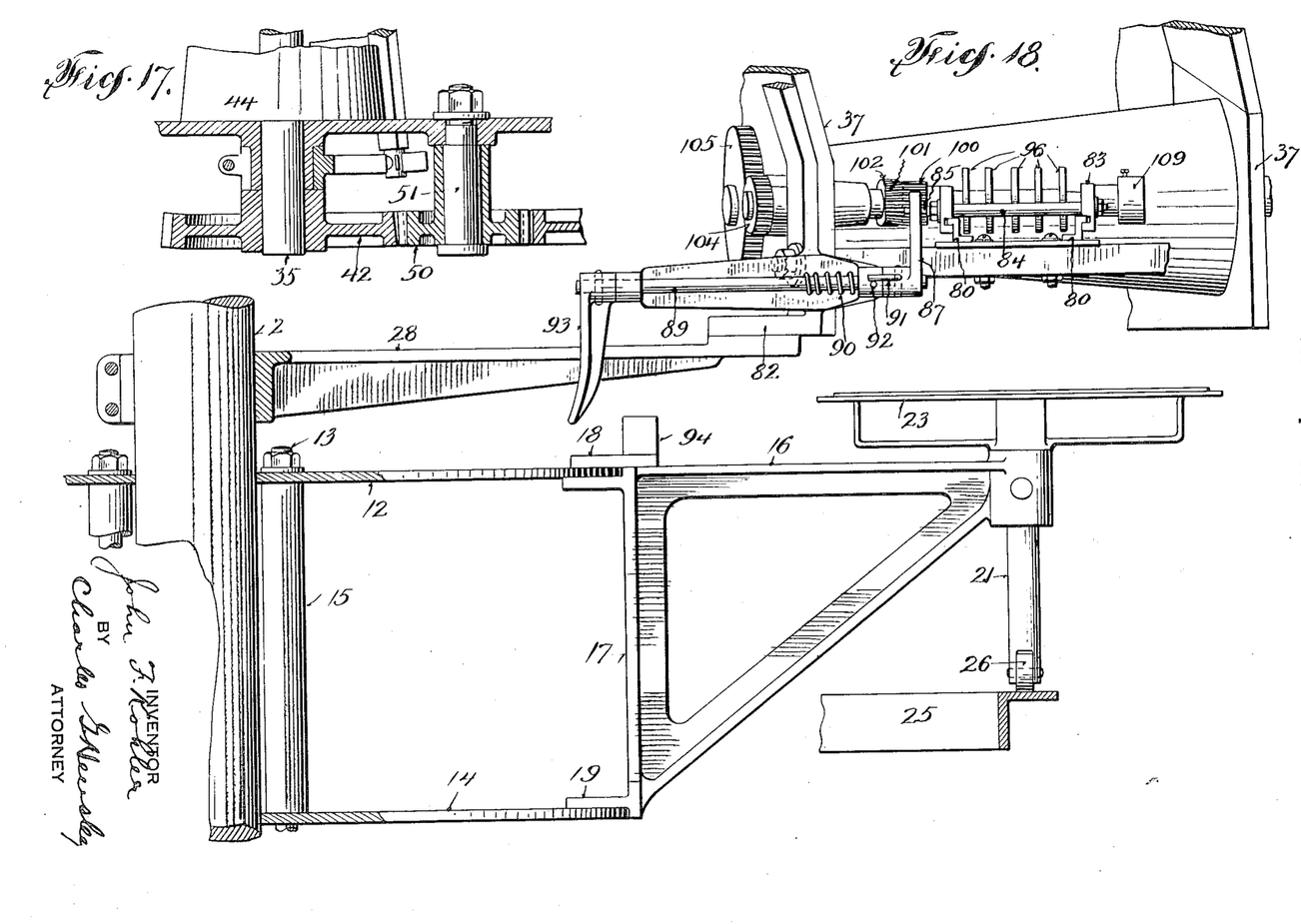
Figure 17 is a detailed sectional view on an enlarged scale, showing a portion of one of the frusto conical dough rollers and its co-operating scraper for dislodging the dough therefrom.
Figure 18 is a view on an enlarged scale showing parts of the machine in a similar manner to that in Figure 2.

On one end of the shaft 89 there is fixed a lever arm 93 which is adapted to be engaged by projecting blocks 94 which are mounted on the turn table or turret so that these blocks will periodically engage the lever arm 93 as the turret revolves, and cause the shaft 89 to be rocked in one direction in opposition to the spring 90; and when the block 94 passes the lever arm 93 the spring 90 returns the shaft to the position where the pin 92 engages the stop pin 91 as shown in Figures 12 and 18. When the shaft 89 is returned by the coiled spring, the lever arm 93 moves back into the path of a succeeding block 94 ready for a succeeding operation. There is a block 94 for each plate carrier, so that the shaft 89 is oscillated once for each plate carrier brought into receiving position and therefore the carriage 83 is reciprocated once for each plate carrier moving into receiving position. The turret revolves clockwise as viewed in Figure 1.

Figure 9:
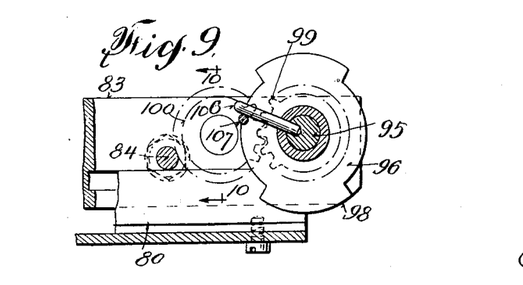
Figure 9 is a sectional view taken on the line 9—9 of Figure 6.
Figure 10:
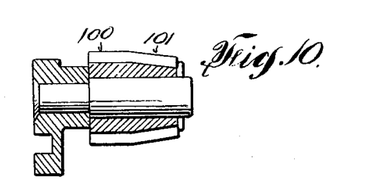
Figure 10 is a sectional view taken on the line 10—10 of Figure 9.
Figure 11:
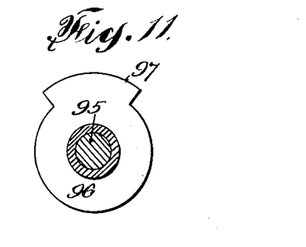
Figure 11 is a sectional view taken on the line 11—11 of Figure 6.

There is a cross shaft 95 journaled in the side members 83 of the reciprocating carriage, and there are mounted upon this shaft one or more marking members or type rollers 96 such as the one shown in Figure 11, which has a single type surface 97 or they may be of the type shown in Figure 9 where there are two type surfaces 98. I have shown five of these type rollers mounted on the shaft 95 although it will be understood that any greater or lesser number may be employed. These rollers will be supplied with indicia on their type surfaces to create an impression in the dough, so that the dough supplied to each pie plate will be marked according to the kind of pie, that is, according to the kind of filler contained in it. The type rollers may be set so that one or more is or are in operative position at a time, and so that some of them are out of operative position and remain ready to be thrown into operation when the pie maker changes from the manufacture of one kind of pie to another.

On one end of the shaft 95 there is a pinion 99 which meshes with the cylindrical teeth of the gear 100 so that the shaft 95 is driven from the gear 100. This gear also has frusto conical teeth 101 on one end, which are adapted to come into mesh periodically with the teeth of the gear 102 which is mounted on the short shaft 103 journaled in a hub of the plate 37. On the same shaft 103 there is a gear 104 which meshes with the gear 105 on the shaft 35 of the lower frusto conical roller, so that the gear 100 is driven from the shaft of this frusto conical roller and the power is transmitted to the small gear 102 for the purpose of driving the gear 104 when the latter is in mesh with the gear 105.

The operation of this branch of the mechanism is as follows: When the parts are in the position shown in Figures 12 and 18, the carriage 83 is retracted away from the surface of the roller 34 and the marking members 96 are disengaged from the dough and do not create any impression upon it. This condition exists while part of the strip of dough is passing the marking device. Each time a plate carrier comes into position to receive dough thereon, one of the blocks 94 of the revolving turret engages the lever arm 93 and as the turret continues to revolve, the block swings the lever arm and this rocks the shaft 89 in opposition to the spring 90.

Figure 13:
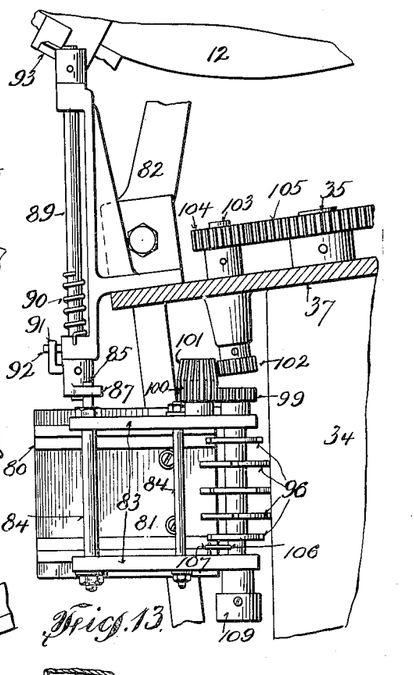
Figure 13 is a similar view of the same parts in a different position assumed during the operation of the machine.
Figures 14, 15, 16:
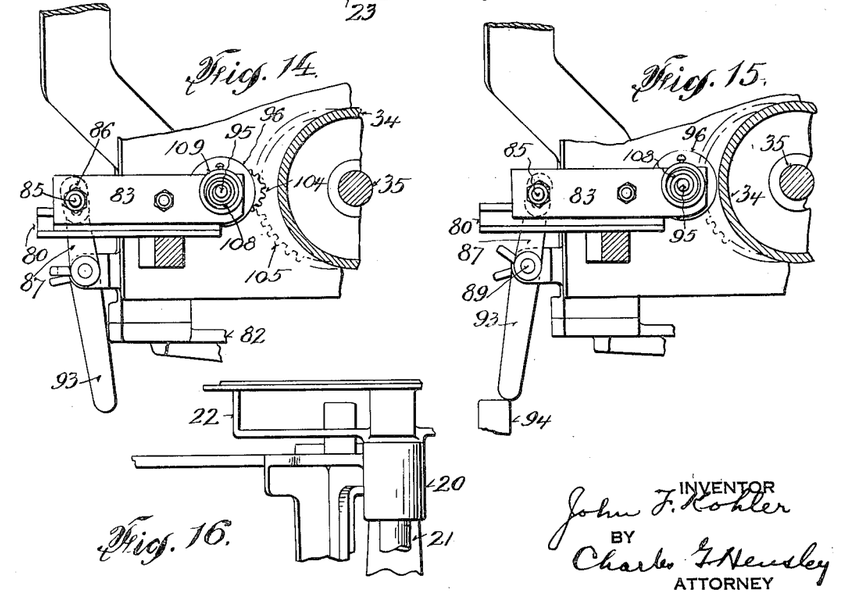
Figure 14 is a sectional view showing in end elevation most of the parts shown in Figure 12.
Figure 15 is a similar view but showing the parts in the position corresponding with their position in Figure 13.
Figure 16 is a plan view of a portion of the marking device.

At the same time the arm 87 rocks with the shaft 89 and it acts on the pin 85 to move the carriage from the position shown in Figure 12 into the position shown in Figure 13. When the carriage arrives at the latter position the frusto conical teeth 101 of the gear 100 are thrown into mesh with the teeth of the gear 102 so that immediately the shaft 95, which carries the marking discs, begins to revolve; and the speed is such that the surface speed of the marking portions of the discs 96 will correspond with the surface speed of the rollers 34, 38.

The shaft 95 with the marking discs will make a partial revolution while the type surfaces of the discs, whether one or several, roll against the dough on the periphery of the cylinder 34 and impress on it a letter, number or other indicia designating the particular kind of filler which is being placed in the pies which are being made in the machine.

As soon as the type discs have completed the application of the impression on the dough, the block 94 will have passed or tripped from the lever arm 93. It will be noted that the turning movement of the shaft 89 which causes the carriage to be advanced toward the roller 34 is a slow or gradual movement, and that the gears 101, 102 will come gradually into mesh without injuring them. On the other hand, when the block 94 trips from the lever 93 there is nothing to restrain the spring 90 from turning backwardly the shaft 89 and therefore the latter makes its return oscillation very rapidly and thus causes a very rapid return of the carriage from the position shown in Figure 13 to the position shown in Figure 12.

When the carriage is quickly retracted, the type discs will not drag against the surface of the dough but will leave a clean imprint thereon. As the carriage is retracted, the gear 101 will be thrown out of mesh with the gear 102 and this will terminate the revolution of the shaft 95 which carries the marking discs.

It will be observed that there is a pin 106 fixed to the shaft 95 which carries the marking discs and this engages against the stop pin 107 of the carriage for the purpose of arresting the rotation of the disc shaft in one direction. There is a spring 108 coiled within the box 109 on the end of the shaft 95 one end of which spring is secured to the screw 110 or the box 109, whereas the other end enters an aperture in the shaft 95.

When the shaft 95 is being revolved, as when the parts are as shown in Figure 13, at which time the gears 101, 102 are in mesh, the shaft 95 is turned in opposition to the spring 108 and the latter is placed under increased tension at the time the discs are marking the dough.

When the carriage is retracted, however, so that the gear 101 is disengaged from the gear 102, the coiled spring 108 immediately revolves the shaft 95 and the marking discs in the opposite direction to the movement imparted while the parts were in the position shown in Figure 13. This return movement will be terminated when the pin 106 comes against the stop pin 107 so that the discs will have been returned to their starting position, ready for a succeeding operation.

It will be apparent, therefore, that the marking discs are revolved with the roller 34 while they are marking the dough, after which they are retracted away from the dough and are then oscillated back to their original starting position.

As there is one tripping block 94 for each plate carrier on the turret, the lever arm 93 will be actuated by one of these blocks each time a plate carrier is about to come into position near the dough rolling device to receive a portion of the strip of dough. The marking device will therefore be timed to operate so that each portion of dough delivered upon a pie plate will be marked to indicate the kind of pie.

The operation of the machine has been partly set forth in the above description. The adjustable guard plate 68 will be adjusted by raising and lowering the strap 63 so that the guard plate will cover more or less of the surface of the roller 38 which lies within the hopper. A supply of dough will be placed in the hopper 33 and this supply will be replenished from time to time as the dough is removed by the action of the rollers. Also a supply of flour for dusting will be placed in the receptacle 71.

Pie plates will be fed into the holders 23 of the plate carriers prior to the time they arrive at the dough receiving position, either by hand or by automatic means (not shown). When the motor 3 is thrown into operation it revolves the shaft 5 and through the chain and sprocket drive described above power is transmitted to the shaft 35 and to the shaft 39 of both of the conical rollers 34, 38 so that the upper one revolves clockwise in Figure 3 and the lower roller moves counterclockwise in the same view. From the shaft 5 power is transmitted through the gears described above to the annular gear 11 which is attached to or is a part of the turret so that the turret revolves preferably continuously around the central post 2. The plate holders revolve in a circular path as they are carried along by the turret; the rollers 26 on the lower ends of the plungers 21 of the several plate carriers ride on the stationary annular plate 25.

The dough in the hopper rests or presses downwardy on the roller 44 which is moving slowly and urging the dough toward the two rollers 34, 38. These latter rollers are in surface contact with the dough and propel it into and through the bight of these rollers so that the dough emerges in the form of a continuous sheet or strip which is of uniform thickness but which partakes of an arcuate shape corresponding with the arcuate path travelled by the plate carriers. The strip of dough will be stripped from the lower roller by the scraper blade 56 so that it will feed downwardly upon the tops of the travelling plates in the plate carriers; and since the strip of dough is of arcuate shape it will feed accurately upon the circularly moving pie plates in the form of a continuous ribbon.

The operation of the shaft 5 acts through the crank 78, the pitman 77, and the lever arm 76 to oscillate the agitator 75 and this causes flour to be sifted through the apertures 72 in the receptacle 71 upon the surface of the upper roller 38. This flour which is dusted on the upper roller moves around with the latter under the guard plate 68 and it is pressed by the roller against the dough as it passes between the two rollers 34, 38 so that when the strip of dough emerges from the bight of the two rollers the flour which was dusted upon the upper roller will be pressed into one surface of the strip of dough.

Each time the plate carrier approaches the dough rolling device, one of the blocks 94 on the turret operates to rock the lever arm 93 and this causes the carriage with the marking device to be moved forwardly or from the position shown in Figure 12 to the position shown in Figure 13. This will bring the marking discs into position to act upon the portion of the dough which is travelling on the surface of the roller 34. At the same time the gear 101 is thrown into mesh with the gear 102 so that the shaft carrying the marking discs is set into operation.

The marking discs revolve at the same surface speed as the surface of the roller 34 and apply the marking to the dough. The carriage is pressed toward the roller 34 resiliently through the action of the spring 90. When the marking discs have completed a partial revolution the block 94 which acted on the arm 93 will have passed the latter and the shaft 89 will have been oscillated back to its first position by the spring 90 and this action quickly returns the carriage away from the roller 34 or from the position shown in Figure 13 back to the position shown in Figure 12.

The roller 34 will continue to revolve and the marked portion of the dough will come upon one of the pie plates. These operations are repeated in timed relation with the travel of the plate carriers so that the portion of dough delivered upon each plate is provided with a marking indicating the kind of pie which is being made.

The shape of the strip of dough is determined by the fact that the two rollers 34, 38 are of frusto conical shape although the bight between these rollers is of equal width across the rollers. In view of the frusto conical shape of these rollers the outer or larger ends will propel the dough between the rollers faster than the portions at the opposite or smaller ends and this will result in the formation of a strip of dough the natural shape of which conforms with the arcuate path travelled by the plate carriers.

As far as I know, while a conical roller has been used for rolling dough, I believe it is broadly new to employ a pair of conical rollers co-operating to produce a strip of dough of arcuate shape. This is necessary in a circular type of machine because if the strip of dough were straight like a belt and were fed upon plates moving in arcuate paths, the portion of the dough lying on the sides of the plate nearest the axis of the turret would be folded over or else the strip of dough would become distorted and tangled. In the present machine the dough is produced originally in the curved shape to conform with the travel of the plates.

Usually the dough which is to form the top crust of the pie is the only one provided with the marking. Pie plates may be fed through the present machine with the marking device thrown out of operation if desired, so that the first layer of dough is fed upon the plates to form the bottom crust. The plates may be removed from the plate carriers and the pie filling placed on the lower layer of dough.

Then the plates with the lower dough and the filler contained in them may be placed back in the machine to make another revolution and receive another portion of the ribbon of dough on top of the filler to form the top crust. During this latter operation the marking device will be placed in operation. However, the plates may remain in the carriers and make two revolutions in the machine, the filler being placed in the plates after the first revolution so that it continues around with the turret and receives the dough for the top crust on the second revolution. If desired, two dough rolling devices like the one shown and described herein may be arranged at opposite sides of the machine so that one device rolls out and applies the dough for the lower crust and the other device rolls out and applies the dough for the top crust, the filler being applied between the two dough rolling devices.

Various changes and modifications may be made in the machine without departing from the spirit and scope of my invention.

Having described my invention, what I claim is:

1. A machine for rolling dough into the form of a strip of arcuate shape, including means for holding a supply of dough, co-operating rollers arranged adjacent each other so that there is a bight between them, said rollers being each in contact with the dough and adapted to propel the dough through said bight, said rollers being of frusto conical shape whereby different portions of the strip of dough are propelled at different relative speeds to form the strip of dough into arcuate shape, and means for propelling said rollers.

2. A machine for rolling dough into the form of a strip of arcuate shape, including means for holding a supply of dough, co-operating rollers arranged adjacent each other, so that there is a bight between them, said rollers being adapted to propel the dough through said bight with the dough in contact with each roller, said rollers being of frusto conical shape, and aranged with their peripheries uniformly spaced across said bight, said rollers propelling different portions of the strip of dough at relatively different speeds to form the strip of dough in arcuate shape, and means for propelling said rollers.

3. A machine for rolling dough into the form of a strip of arcuate shape, including means for holding a supply of dough, co-operating rollers of frusto conical shape arranged with their peripheries adjacent each other and with the larger portions of said rollers opposed to each other and the smaller portions thereof opposed to each other, so that a bight is formed between the said rollers, said rollers being adapted to propel the dough through said bight with the dough in contact with each roller and to propel different portions at relatively different speeds to form the strip of dough in arcuate shape, and means for propelling said rollers.

4. A machine for rolling dough into a strip of even thickness and of arcuate shape, including means for holding a supply of dough, rollers of frusto conical shape disposed with their axes divergent to each other and with the peripheries of said rollers arranged adjacent each other to form a bight of equal width throughout, the larger ends of said rollers being opposed to each other and the smaller portions thereof being opposed to each other, said rollers being adapted to propel the dough through said bight with the dough in contact with each roller whereby the strip of dough will have an arcuate shape, and means for propelling said rollers.

5. A machine for rolling dough into the form of a strip of arcuate shape, including means for holding a supply of dough, co-operating rollers arranged adjacent each other so that there is a bight between them, said rollers being adapted to propel the dough through said bight with each roller in contact with the dough, said rollers being of frusto conical shape whereby different portions of the strip of dough are propelled at relatively different speeds to form the strip of dough into arcuate shape, and means for propelling said rollers at the same surface speed.

6. A machine for rolling dough into the form of a strip of arcuate shape, including means for holding a supply of dough, co-operating rollers arranged adjacent each other to form a bight between them, said rollers being adapted to propel the dough through said bight with each roller in contact with the dough, said rollers being of frusto conical shape, whereby said rollers propel the dough at different relative speeds across the width of the dough, both said rollers being of the same diameter at different points in their length, whereby a strip of dough is formed of arcuate shape, and means for propelling said rollers at the same surface speed.

7. A machine for rolling dough into the form of a strip of arcuate shape, including means for holding a supply of dough, a pair of co-operating, frusto conical rollers arranged adjacent each other so that there is a bight between them, each roller in contact with the dough and propelling the dough through said bight, said rollers being disposed with their axes arranged in divergent relation and the rollers being disposed with their larger ends opposed to each other and their smaller ends opposed to each other to form a bight of uniform width, shafts on which said rollers are mounted, gears on said shafts meshing with each other to cause the rollers to revolve in unison, and means for propelling said rollers.

8. A machine of the character described, including a carrier for holding a plurality of receptacles, means for operating said carrier to convey said receptacles in a circular path, means for holding a supply of dough, co-operating rollers arranged adjacent each other so that there is a bight between them, said rollers being of frusto conical shape and adapted to propel the dough through said bight to form the same into a strip of arcuate shape, and arranged to deliver the dough to the receptacles carried by said carrier, and means for propelling said rollers.

9. A machine of the character described, including a carrier for holding a plurality of receptacles disposed in circular relation to each other, means for operating said carrier to convey said receptacles in a circular path, means for holding a supply of dough, co-operating frusto conical rollers arranged adjacent each other so that there is a bight between them, said rollers adapted to propel the dough through said bight to form the same into a strip to be fed to said receptacles, said rollers being of frusto conical shape and so designed as to cause the strip of dough to be formed on an arc of curvature substantially conforming to the circular path of said receptacles, and means for propelling said rollers.

10. A machine of the character described including a revolvable carrier having means for holding a plurality of receptacles arranged closely together in circular form, means for operating said carrier to convey said receptacles in a horizontal, circular path, means for holding a supply of dough above said carrier, co-operating rollers arranged adjacent each other to form a bight between them and adapted to propel the dough through said bight to form the same into a strip, said rollers being of frusto conical shape, and designed to cause the strip of dough to form on an arm substantially corresponding to the circular path of said receptacles, and means for propelling said rollers.

11. A machine of the character described, including a carrier having means for holding a plurality of receptacles disposed in circular relation, means for operating said carrier to convey said receptacles in a circular path, means disposed above said carrier and in a fixed position, whereby the receptacles will be moved in a circular path thereunder, said means including a receptacle for holding a supply of dough, co-operating frusto conical rollers arranged adjacent each other to form a bight between them, said rollers being adapted to propel the dough through said bight and to deliver the same in the form of a strip of arcuate shape to the receptacles moving with said carrier, and means for operating said rollers.

12. A machine for rolling dough into the form of a strip of arcuate shape, including a hopper for holding a supply of dough, co-operating frusto conical rollers arranged adjacent each other to form a bight between them, said rollers being adapted to propel the dough through said bight and propel different portions in the width of the strip of dough at relatively different speeds whereby the strip will have an arcuate shape, and a third frusto conical roller adjacent the bottom of said hopper, adapted to move the dough toward said first rollers, and means for operating said several rollers.

13. A machine for rolling dough into the form of a strip of arcuate shape, including a hopper for holding a supply of dough, co-operating frusto-conical rollers arranged adjacent each other to form a bight between them, said rollers being adapted to propel the dough through said bight and to propel different portions in the width of the strip of dough at relatively different speeds whereby the strip will have an arcuate shape, and a third frusto-conical roller adjacent the bottom of said hopper adapted to move the dough toward said first rollers, and means for operating said pair of rollers at the same surface speed, and means for operating said third roller at lower surface speed than said pair of rollers.

14. A machine of the character described including a carrier for holding a plurality of receptacles, arranged in circular relation thereon, means for revolving said carrier to convey said receptacles in a circular path, means for holding a supply of dough, co-operating rollers arranged adjacent each other to form a bight between them, said rollers being of frusto-conical shape and mounted with their axes directed toward the axis of said carrier, said rollers adapted to propel the dough through said bight in the form of a strip of arcuate shape to the receptacles on said carrier, and means for operating said rollers.

15. In a machine of the class described, the combination of means for holding a supply of dough, rollers for taking the dough from said supply and rolling it into the form of a strip, said rollers being arranged in co-operative relation whereby a bight is formed between them, and an adjustable guard co-operating with at least one of said rollers and adjustable to vary the extent of surface contact between said roller and the dough, said guard being disposed to act on the dough before it passes through said bight and means for operating said rollers.

16. In a machine of the class described, the combination of means for holding a supply of dough, co-operating rollers of frusto conical shape arranged whereby a bight is formed between said rollers, said rollers being adapted to take the dough from said supply and to propel it through said bight to form a strip of arcuate shape, and a guard plate co-operating with at least one of said rollers and adapted to be adjusted to vary the area of contact of the dough with one of said rollers to regulate the impression action of said rollers on the dough.

17. In a machine of the class described, the combination of means for holding a supply of dough, co-operating rollers arranged with a bight between them, said rollers being adapted to take the dough from said source of supply and to propel it through said bight to form a strip, a curved guard plate for covering a portion of the surface of at least one of said rollers to limit the area of contact of the dough with said roller, said guard plate having pintles adjacent one end thereof, stationary members having arcuate slots with which said pintles engage, a supporting member for the opposite end of said plate, pivotally connected therewith, and means for adjustably attaching said supporting means to a stationary member whereby said guard plate may be adjusted to vary the surface contact of the dough with said roller.

18. In a machine of the class described, the combination of means for holding a supply of dough, a pair of co-operating rollers arranged with a bight between them, said rollers being each in contact with the dough and adapted to take the dough from said supply and to propel it through said bight to form a strip of dough, and means for dusting flour on at least one of said rollers in advance of the line at which the dough comes into contact with said roller, whereby said flour is applied to the portion of the dough which forms one surface of the strip and a guard arranged to prevent the dough from coming into contact with the dusted portion of the roller until it reaches approximately the bight of said rollers.

19. In a machine of the class described, the combination of means for holding a supply of dough, a pair of co-operating rollers arranged to form a bight between them, said rollers being each in contact with the dough and adapted to take the dough from said supply and to propel it through said bight to form a strip of dough, a container disposed adjacent one of said rollers for holding a supply of flour, and having openings to discharge the flour on said roller, an agitator for causing the flour to be sifted onto said roller, whereby said flour is applied to the portion of the dough which forms one surface of the strip, means for automatically operating said agitator and a guard arranged adjacent the roller to which the flour is applied, said guard arranged to prevent the dough from coming into contact with the dusted portion of said roller until the dough arrives at or approximately at the bight of said rollers.

20. In a machine of the class described, the combination of means for holding a supply of dough, a pair of co-operating rollers arranged to form a bight between them, said rollers being adapted to take the dough from said supply and to propel it through said bight to form a strip, and a guard arranged close to but out of contact with one of said rollers, and adjustable for the purpose of varying the area of contact of the dough with the surface of said roller, and means for automatically dusting flour on said roller in advance of the position of said guard, means for operating said rollers, and means for operating said dusting device.

21. A machine of the class described, including means for holding a supply of dough, co-operating rollers arranged with a bight between said rollers, said rollers adapted to take the dough from said supply and to propel it through said bight to form a strip, oscillating means acting on the strip of dough while it is travelling with and against the surface of one of said rollers, said means being adapted to print indicia on the strip of dough, and means for revolving said printing means in timed relation with the movement of the strip while the same is in contact therewith.

22. A machine of the class described, including means for holding a supply of dough, co-operating rollers adapted to take the douh from said supply and to propel it through said bight to form a strip, circular and oscillating means acting on the strip of dough while it is travelling with and against the surface of one of said rollers for the purpose of printing indicia on the strip of dough, means for oscillating said printing means and means for periodically withdrawing said printing means from contact with the strip of dough.

23. A machine of the class described, including means for holding a supply of dough, co-operating rollers arranged to form a bight between them, said rollers being adapted to take the dough from said supply and to propel it through said bight to form a strip, oscillating means having printing members adapted to act on the strip of dough while it is travelling with and against the surface of one of said rollers to print indicia on the strip of dough, means for periodically withdrawing said printing means from the strip of dough whereby the printing means will act intermittently on the strip of dough, and means for oscillating said printing means to move with the dough while engaged therewith and to return said printing means to a starting position while the same is disengaged from the dough.

24. A machine of the class described, including means for holding a supply of dough, co-operating rollers adapted to take the dough from said supply and to propel it through said bight to form a strip, oscillating means having marking members arranged to act on the strip of dough while the same is travelling with the surface of one of said rollers, means for moving said oscillating means to place said marking means into and out of operative position, a gear for operating said oscillating means, a gear operated in synchronism with said rollers and with which said first mentioned gear is adapted to be thrown into and out of mesh periodically on the movement of said marking means into and out of operative position, whereby said marking means will be operated in synchronism with said rollers when in marking position.

25. A machine of the class described, including means for holding a supply of dough, co-operating rollers adapted to take the dough from said supply and to propel it through said bight to form a strip, oscillating means having marking members arranged to act on the strip of dough while the same is travelling with the surface of one of said rollers, means for moving said oscillating means to place said marking means into and out of operative position, a gear for operating said oscillating means, a gear operated in synchronism with said rollers and with which said first mentioned gear is adapted to be thrown into and out of mesh periodically on the movement of said marking means into and out of operative position, whereby said marking means will be operated in synchronism with said rollers when in marking position, and spring means for returning said oscillating means to a starting position.

26. A machine of the class described, including means for holding a supply of dough, co-operating rollers adapted to take the dough from said supply and to propel it through said bight to form a strip, a reciprocating carriage, oscillating means mounted on said carriage and having marking means adapted to act on the dough while travelling with one of said rollers, means for reciprocating said carriage to place said marking means into and out of operative relation with the strip of dough, a gear on said oscillating means, a second gear meshing with and operating said first gear, a gear operated in synchronism with said rollers, said second mentioned gear being adapted to be placed into and out of meshing relation with said third gear upon the reciprocation of said carriage, and spring means for returning said oscillating means to a starting position when said second gear is disengaged from said third gear.

27. A machine of the class described, including means for holding a supply of dough, co-operating rollers adapted to take the dough from said supply and to propel it through said bight to form a strip, a carriage, oscillating means thereon having marking means adapted to mark the strip of dough while travelling with one of said rollers, means operated in synchronism with said rollers for operating said oscillating means while the marking members are in active position, means for automatically returning said oscillating means to a starting position, and means for reciprocating said carriage to place said marking means into and out of operative position, including means for resistibly moving said carriage to place said marking means into operative position.

28. A machine of the class described, including a carrier for holding receptacles and for moving them in a circular path, means for holding a supply of dough, co-operating rollers arranged with a bight between them, said rollers both in contact with the dough and adapted to take the dough from said supply and to propel it through said bight to form a strip for delivery upon said receptacles, means for periodically and automatically marking indicia on the strip of dough while the same is engaged with at least one of said rollers, and means for causing the periodical operation of said marking means in synchronism with the operation of said carrier.

29. In a machine of the class described, a revolvable carrier having means for holding receptacles, and for moving them in a circular path, means for holding a supply of dough, cooperating rollers arranged with a bight between them, said rollers both in contact with the dough and adapted to take the dough from said supply and to propel it through said bight to form a strip, a reciprocating carriage, means carried thereby for periodically marking indicia on a strip of of dough while travelling in contact with one of said rollers, means on said carrier for moving said carriage into operative position, and spring means for returning said carriage to move the carrying means out of operative position.

JOHN F. KOHLER.